(12) United States Patent
Caprario (10) Patent No.: US 10,215,037 B2
(45) Date of Patent: Feb. 26, 2019

(54) CONTOURED RETAINING RING

(71) Applicant: UNITED TECHNOLOGIES CORPORATION, Farmington, CT (US)

(72) Inventor: Joseph T. Caprario, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 399 days.

(21) Appl. No.: 15/154,351

(22) Filed: May 13, 2016

(65) Prior Publication Data

US 2017/0328224 A1 Nov. 16, 2017

(51) Int. Cl.
*F01D 5/30* (2006.01)
*F01D 11/00* (2006.01)
*F16B 21/18* (2006.01)

(52) U.S. Cl.
CPC .......... *F01D 5/3015* (2013.01); *F01D 11/006* (2013.01); *F05D 2220/32* (2013.01); *F05D 2240/20* (2013.01); *F05D 2260/30* (2013.01); *F05D 2260/941* (2013.01); *F16B 21/18* (2013.01)

(58) Field of Classification Search
CPC ........ F01D 5/3015; F01D 5/025; F01D 5/026; F01D 11/006; F05D 2260/30; F05D 2260/36; F05D 2300/501; F16B 21/18
USPC ................................................ 403/335, 338
See application file for complete search history.

(56) References Cited

U.S. PATENT DOCUMENTS

| 1,638,209 | A | * | 8/1927 | Niebuhr | F16B 21/18 411/532 |
|---|---|---|---|---|---|
| 4,343,581 | A | * | 8/1982 | Millheiser | F16B 21/18 411/353 |
| 4,752,178 | A | * | 6/1988 | Greenhill | F16B 21/18 403/326 |
| 4,767,276 | A | * | 8/1988 | Barnes | F01D 5/3015 416/220 R |
| 5,281,098 | A | | 1/1994 | Glynn | |
| 5,330,324 | A | * | 7/1994 | Agram | F01D 5/3015 416/220 R |

(Continued)

FOREIGN PATENT DOCUMENTS

| DE | 102005048198 A1 * | 4/2007 | ............. F16B 21/18 |
|---|---|---|---|
| EP | 2918785 | 9/2015 | |

(Continued)

OTHER PUBLICATIONS

Extended European Search Report dated Nov. 23, 2017 in Application No. 17158977.3.

*Primary Examiner* — Igor Kershteyn
*Assistant Examiner* — Topaz L. Elliott
(74) *Attorney, Agent, or Firm* — Snell & Wilmer, L.L.P.

(57) ABSTRACT

A retaining ring assembly for a gas turbine engine may include a first engine component and a second engine component. A retaining ring may be disposed between the first engine component and the second engine component. The retaining ring may be circumferentially discontinuous and may include a first terminal portion having at least one of a tapered or a contoured geometry. A thickness of the retaining ring at the first terminal portion may be less than a thickness of the retaining ring away from the first terminal portion.

18 Claims, 5 Drawing Sheets

(56) References Cited

U.S. PATENT DOCUMENTS

| | | | |
|---|---|---|---|
| 5,338,154 | A | 8/1994 | Meade |
| 7,217,100 | B2 * | 5/2007 | Benderradji .......... F01D 5/3015 416/221 |
| 8,257,029 | B2 * | 9/2012 | Habarou ................ F01D 11/08 415/135 |
| 8,757,966 | B2 * | 6/2014 | Blanchard .............. F01D 9/042 D9/42 |
| 9,920,655 | B2 * | 3/2018 | Stricker ................... F01D 9/02 |
| 2002/0018719 | A1 | 2/2002 | Arilla |
| 2012/0051918 | A1 | 3/2012 | Glasspoole |
| 2013/0323052 | A1 * | 12/2013 | Zhang .................... F01D 5/326 416/1 |
| 2014/0255196 | A1 | 9/2014 | Anderson |
| 2014/0314578 | A1 * | 10/2014 | Xu .......................... F01D 5/10 416/220 R |
| 2015/0132123 | A1 * | 5/2015 | Stricker ................... F01D 9/02 415/209.2 |
| 2015/0260049 | A1 * | 9/2015 | Littler ..................... F01D 5/025 416/220 R |
| 2018/0066529 | A1 * | 3/2018 | Wadsworth .............. F01D 5/06 |
| 2018/0087397 | A1 * | 3/2018 | Caprario ............... F01D 5/3015 |
| 2018/0202496 | A1 * | 7/2018 | Yang ........................ F16D 1/04 |

FOREIGN PATENT DOCUMENTS

| | | |
|---|---|---|
| GB | 2198780 | 6/1988 |
| GB | 2270544 | 3/1994 |
| WO | WO2014137406 | 9/2014 |
| WO | WO2015088623 | 6/2015 |

\* cited by examiner

CONTOURED RETAINING RING

GOVERNMENT LICENSE RIGHTS

This disclosure was made with government support under contract No. N00019-02-C-3003 awarded by the United States Air Force. The government has certain rights in the disclosure.

FIELD

The present disclosure relates to gas turbine engines, and, more specifically, to a retaining ring for a rotor cover plate.

BACKGROUND

A gas turbine engine typically includes a fan section, a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The compressor and turbine sections typically include a series of alternating rotors and stators. Turbine and compressor rotors may include a rotor disk and a plurality of circumferentially spaced turbine blades. Rotor disks may include cover plates attached thereto. Rotor disks cover plates may be subject to high radial forces. Further, cover plates may be subject to high stress at the contact surfaces of cover plates, which may reduce the performance and operating life of the cover plates.

SUMMARY

A retaining ring assembly for a gas turbine engine is provided. A retaining ring assembly may include a first engine component and a second engine component. A retaining ring may be disposed between the first engine component and the second engine component. The retaining ring may be circumferentially discontinuous and may include a first terminal portion having at least one of a tapered or a contoured geometry.

In various embodiments, a thickness of the retaining ring at the first terminal portion may be less than a thickness of the retaining ring away from the first terminal portion. The contoured geometry of the first terminal portion may include a rounded terminal edge. A first terminal edge and a second terminal edge of the retaining ring may define an opening extending radially though the retaining ring. An inner surface of the retaining ring may slope away from the first engine component and toward the first terminal edge. An outer surface of the retaining ring may slope away from the second engine component and toward the second terminal edge. The outer surface of the retaining ring may include a curved slope.

A rotor assembly of a gas turbine engine is also provided. The rotor assembly may include a rotor disk and a rotor blade coupled to the rotor disk, the rotor disk configured to rotate about an axis. The rotor assembly may include a retaining ring assembly. The retaining ring assembly may include a flange extending axially from the rotor disk. A cover plate may be disposed between the flange and the rotor disk. A retaining ring may be disposed between the flange and the cover plate. The retaining ring may be circumferentially discontinuous and may include a first terminal portion having at least one of a tapered or a contoured geometry.

In various embodiments, the contoured geometry of the first terminal portion may include a rounded terminal edge. A thickness of the retaining ring at the first terminal portion may be less than a thickness of the retaining ring away from the first terminal portion. A first terminal edge and a second terminal edge of the retaining ring may define an opening extending radially though the retaining ring. An inner surface of the retaining ring may slope away from the cover plate and toward the first terminal edge. An outer surface of the retaining ring may slope away from the flange and toward the second terminal edge. The outer surface of the retaining ring may include a curved slope. The cover plate may be disposed circumferentially along a radially outward edge of the rotor disk. The rotor assembly may be a part of a compressor section or a turbine section.

A gas turbine engine is also provided. The gas turbine engine may include a turbine section including a rotor assembly. The rotor assembly may include a rotor disk and a rotor blade coupled to the rotor disk. The rotor disk may be configured to rotate about an axis. The rotor assembly may further include a retaining ring assembly. The retaining ring assembly may include a flange extending axially from the rotor disk. A cover plate may be disposed between the flange and the rotor disk. A retaining ring may be disposed between the flange and the cover plate. The retaining ring may be circumferentially discontinuous and may include a first terminal portion having at least one of a tapered or a contoured geometry.

In various embodiments, the contoured geometry of the first terminal portion may include a rounded terminal edge. An inner surface of the retaining ring may slope away from the cover plate at the first terminal portion. A thickness of the retaining ring at the first terminal portion may be less than a thickness of the retaining ring away from the first terminal portion.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
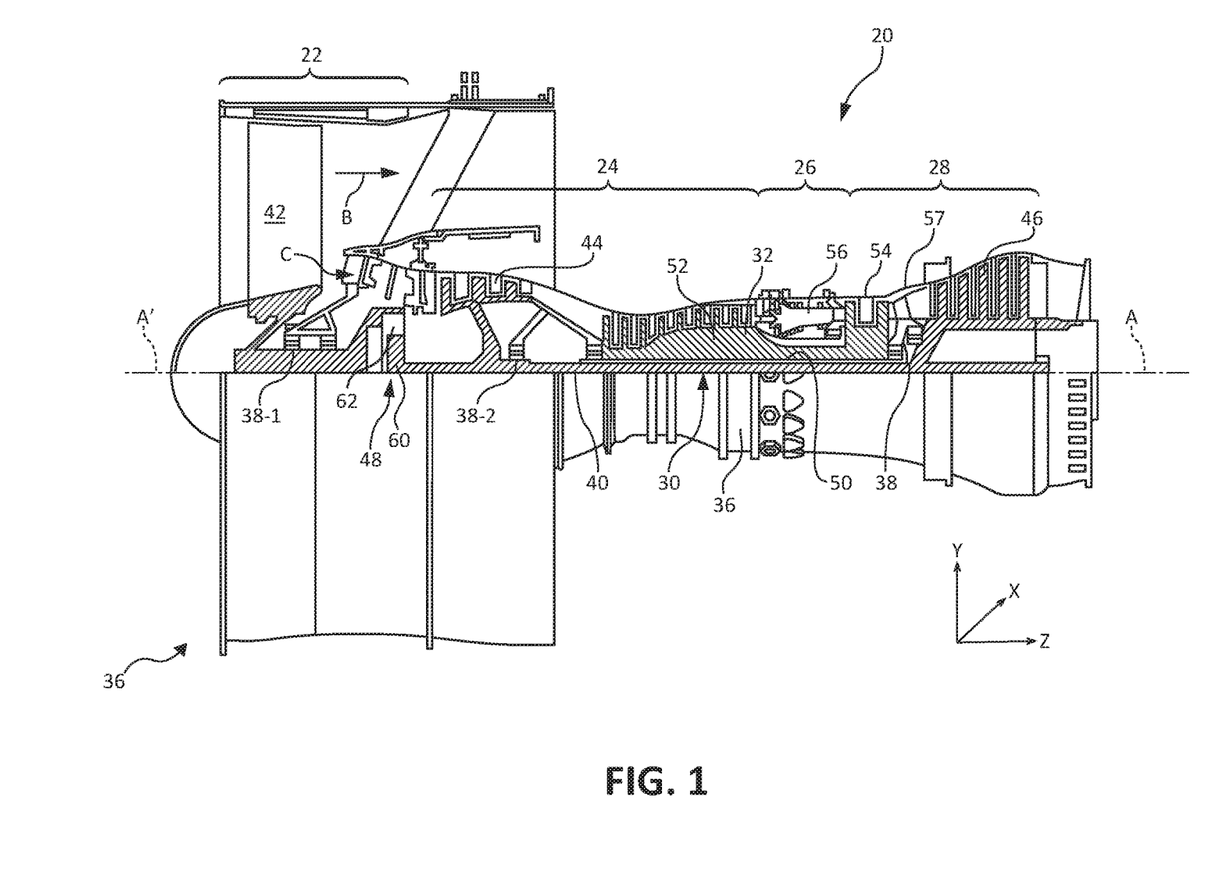
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, a turboshaft, or may comprise any gas turbine engine as desired.

In various embodiments, low pressure compressor 44, high pressure compressor 52, low pressure turbine 46, and high pressure turbine 54 may comprise one or more stages or sets of rotating blades ("rotors") and one or more stages or sets of stationary vanes ("vanes") axially interspersed with the associated blade stages but non-rotating about engine central longitudinal axis A'-A. The compressor and turbine sections 24, 28 may collectively be referred to as rotor systems. Within the rotor systems of gas turbine engine 20 are multiple rotor disks, each of which may include one or more cover plates.

Figure 2A:
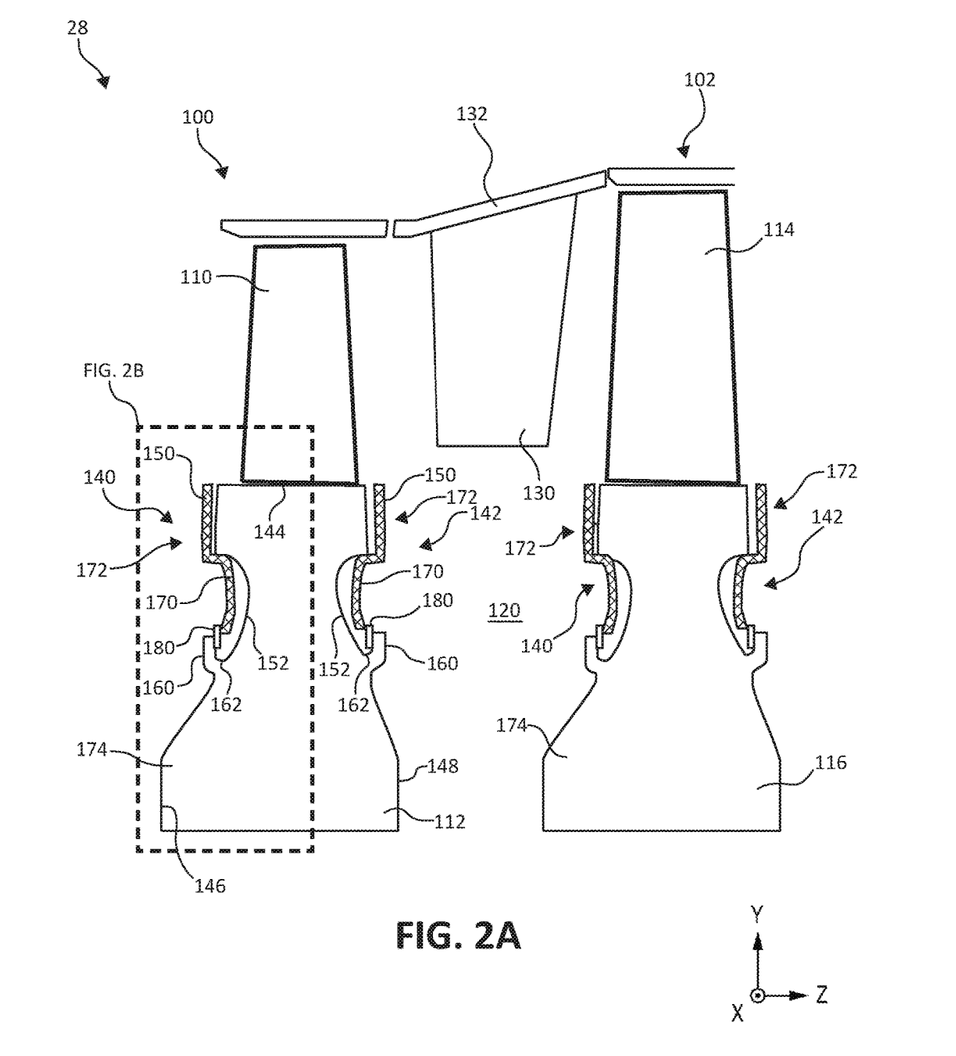
FIG. 2A illustrates a cross-sectional view of a rotor-stator assembly of a gas turbine engine including a retaining ring assembly, in accordance with various embodiments.

With reference to FIG. 2A, a portion of turbine section 28 is illustrated, in accordance with various embodiments. Turbine section 28 includes a plurality of rotor assemblies, such as rotor assemblies 100, 102. Rotor assembly 100 may include a rotor blade 110 coupled to a rotor disk 112. Similarly, rotor assembly 102 may include a rotor blade 114 coupled to a rotor disk 116. Rotor disk 112 and rotor disk 116 may define a rotor cavity 120 between rotor disks 112, 116. Rotor disks 112, 116 may be configured to rotate about engine central longitudinal axis A-A'. Turbine section 28 may include a plurality of vanes, such as vane 130. An outer diameter edge of vane 130 may be coupled to a platform 132. In response to fluid, such as air, flowing through turbine section 28, rotor blade 110 may rotate relative to vane 130 in the circumferential direction. The fluid may then be received by vane 130 which conditions the fluid prior to the fluid reaching rotor blade 114. Rotor blade 114, like rotor blade 110, may rotate relative to vane 130 in the circumferential direction in response to receiving the flow of fluid.

In various embodiments, rotor assemblies 100, 102 within turbine section 28 may employ a plurality of cover plates 140, 142 coupled to each of rotor disks 112, 116. Referring to rotor disk 112, cover plates 140, 142 may be mounted proximal to a radially outward edge 144 of rotor disk 112. Cover plates 140, 142 may extend circumferentially along forward and aft surfaces of rotor disk 112 at radially outward edge 144. Cover plate 140 may be coupled to an axially forward surface 146 of rotor disk 112. Cover plate 142 may be coupled to an axially aft surface 148 of rotor disk 112. Surfaces 146, 148 may comprise opposing surfaces of rotor disk 112. As rotor disk 112 rotates, so do cover plates 140, 142. Cover plates 140 and 142 may be similarly mounted to rotor disk 116.

In various embodiments, each of cover plates 140, 142 may have a distal flange 150 extending radially outward and interfacing with rotor disk 112. Each of cover plates 140, 142 may have a proximal flange 170 extending radially inward from distal flange 150. Proximal flange 170 of cover plates 140, 142 may interface with axially forward surface 146 and axially aft surface 148 of rotor disk 112 by complementary geometry to form, for example, an interference fit between a cover plate 140, 142 and a surface 146, 148 of rotor disk 112. Each of surfaces 146, 148 of rotor disk 112 may define channel 152 extending circumferentially along each surface 146, 148. Proximal flange 170 of cover plate 140 may fit within channel 152 in axially forward surface 146; and proximal flange 170 of cover plate 142 may fit within channel 152 in axially aft surface 148.

In various embodiments, proximal flange 170 of each cover plate 140, 142 further interfaces with a flange 160 of rotor disk 112. Rotor disk 112 may include one or more flanges 160 protruding axially away from rotor disk 112 from each of surfaces 146, 148 of rotor disk 112. Flanges 160 may further extend radially outward to form a hook shape extending axially away and radially outward from surfaces 146, 148. Flanges 160 may extend circumferentially around rotor disk 112. In the illustrated example, a flange 160 protrudes from a forward (upstream) side of rotor disk 112 and a flange 160 protrudes from an aft (downstream) side of rotor disk 112.

Each flange 160 may further define a groove 162 formed in each of surfaces 146, 148 of rotor disk 112, wherein each groove 162 may be partially defined by or integral with channel 152. Flange 160 may define a forward surface of groove 162, and axially forward surface 146 of rotor disk 112 may define an aft surface of groove 162, which may be a u-shaped channel. In other words, a radially inward portion of channel 152 may comprise groove 162, such that axially forward surface 146 of rotor disk 112 defines channel 152, groove 162 and flange 160. Proximal flange 170 may be disposed within channel 152 and may extend toward groove 162.

In various embodiments, a retaining ring 180 may be configured to hold or lock each of cover plates 140, 142 to rotor disk 112. A retaining ring 180 may be inserted between flange 160 of rotor disk 112 and cover plate 140 to form a mechanical interface between cover plate 140 and flange 160 and to retain cover plate 140 with respect to flange 160 at axially forward surface 146 of rotor disk 112. Similarly, a retaining ring 180 may be inserted between flange 160 of rotor disk 112 and cover plate 142 to form a mechanical interface between cover plate 142 and flange 160 and to retain cover plate 142 with respect to flange 160 at axially aft surface 148 of rotor disk 112.

In various embodiments, a retaining ring 180 may be disposed between a first engine component 172 and a second engine component 174, wherein the first engine component 172 may include cover plate 140 or 142 and the second engine component 174 may include rotor disk 112. The first engine component 172 and second engine component 174 may comprise any stationary or rotating engine components that include a retaining ring 180 disposed therebetween.

Figure 2B:
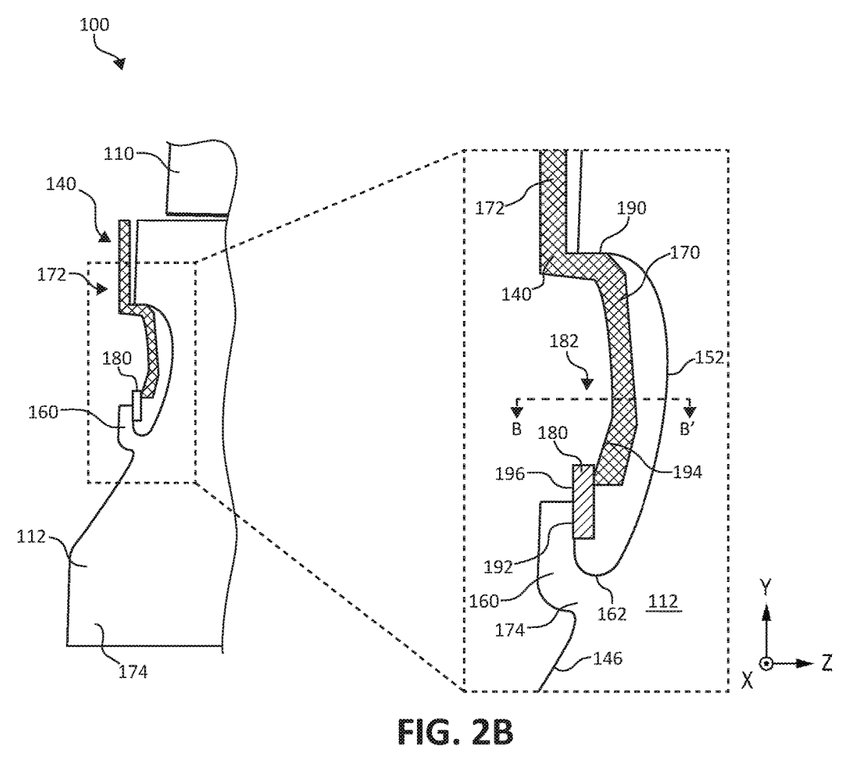
FIG. 2B illustrates an axial cross-sectional view of a retaining ring assembly, in accordance with various embodiments.

With reference to FIG. 2B, rotor assembly 100 is shown in additional detail in accordance with various embodiments. Rotor disk 112 includes a cover plate 140 and retaining ring 180. Axially forward surface 146 of rotor disk 112 may include channel 152 with proximal flange 170 of cover plate 140 disposed within channel 152. Cover plate 140 may contact rotor disk 112 at an interface ridge 190 disposed at a radially outward location of channel 152. Cover plate 140 may fit in a radially inward position adjacent to interface ridge 190. Cover plate 140 and rotor disk 112 may form an interference fit at interface ridge 190. Thus, cover plate 140 may be held in place at interface ridge 190, and may further be held in place by retaining ring 180 and flange 160. Flange 160 of rotor disk 112 may be disposed at a radially inward location of channel 152, opposite to interface ridge 190. Proximal flange 170 may extend toward groove 162, and may not extend completely to or overlap radially with flange 160. Retaining ring 180 may be disposed between flange 160 and cover plate 140. Retaining ring 180 may form a point of contact for proximal flange 170 of cover plate 140, which may not reach flange 160. When installed, retaining ring 180 may extend radially outward from an axially aft surface 192 of flange 160 toward cover plate 140, thereby bridging a gap between cover plate 140 and flange 160.

In various embodiments, retaining ring 180 may include an annular shape or a split annular shape. Retaining ring 180 may be split for ease of insertion within groove 162. Retaining ring 180 may be positioned between flange 160 and cover plate 140. Retaining ring 180 may contact axially aft of surface 192 of flange 160 and may contact an axially forward surface 194 of cover plate 140. Retaining ring 180 may have an annular geometry with an outer surface 196 comprising a circular and circumferential contour such that outer surface 196 generally forms an annular ring. As a split ring, retaining ring 180 may comprise a discontinuous annular ring. Rotor disk 112 with flange 160, cover plate 140, and retaining ring 180 may comprise a retaining ring assembly 182 configured to retain cover plate 140 in a position with respect to rotor disk 112.

In various embodiments, retaining ring assembly 182 may comprise a first engine component 172 and a second engine component 174 including a retaining ring 180 disposed therebetween. The first engine component 172 and second engine component 174 may comprise any stationary or rotating engine components that include a retaining ring 180 disposed therebetween. The first engine component 172 may include cover plate 140 or 142 and the second engine component 174 may include rotor disk 112.

Figure 2C:
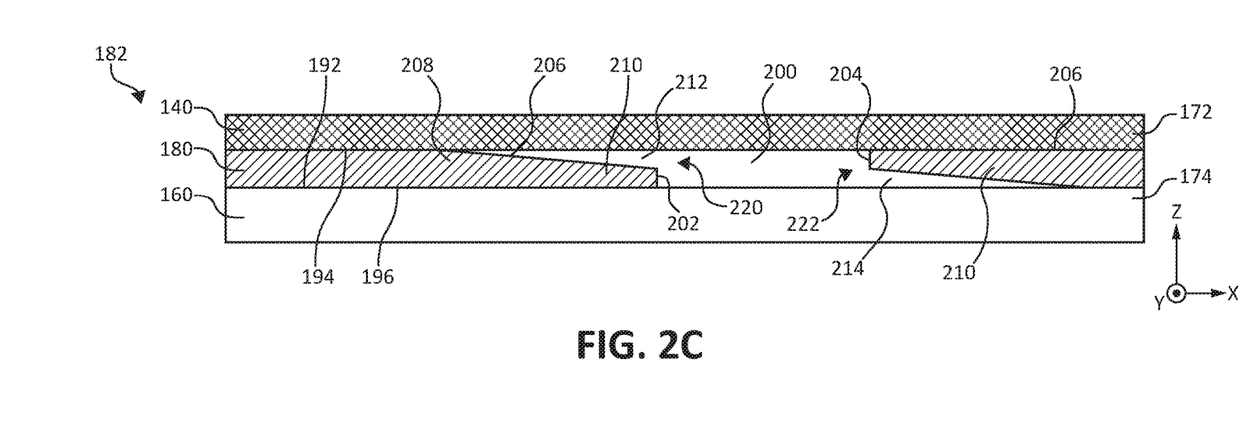
FIG. 2C illustrates a radial cross-sectional view taken along line B-B' of FIG. 2B of a tapered retaining ring of a retaining ring assembly, in accordance with various embodiments.

With reference to FIG. 2C, additional detail of a retaining ring assembly 182 is shown in accordance with various embodiments. In various embodiments, retaining ring 180 may be a discontinuous annular ring, which is circumferentially discontinuous or split at an opening 200. Retaining ring 180 having a split may terminate at terminal edge 202 and a terminal edge 204, which define an opening 200 therebetween. Opening 200 may extend radially and completely through retaining ring 180. Opening 200 in retaining ring 180 may be defined by a terminal edge 202 and a terminal edge 204 of retaining ring 180. Retaining ring 180 may include an inner surface 206 opposite to outer surface 196. Inner surface 206 and/or outer surface 196 of retaining ring 180 may include a tapered, curved, rounded, and/or contoured surface geometry. Retaining ring 180 may include a first portion 208 having a flat geometry with a generally uniform thickness and may include a second portion 210 having a tapered, curved, rounded, and/or contoured geometry. Second portion 210 may comprise a terminal portion of retaining ring 180, and retaining ring 180 may include a second portion 210 disposed at each of terminal edges 202, 204. In various embodiments, second portion 210 having a tapered, curved, rounded, and/or contoured geometry reduces stress in a first engine component 172, which may comprise cover plate 140.

In various embodiments, retaining ring 180 may be manufactured using forging, casting, additive manufacturing, machining or the like. The features of retaining ring 180, such as opening 200 and inner surface 206 geometry, may further be formed by milling, electrochemical machining (ECM), or electrical discharge machining (EDM) as desired, for example. In various embodiments, retaining ring 180 may include a metal, such as titanium, titanium-based alloy, cobalt, cobalt-based alloys, nickel, nickel-based alloy, for example, austenitic nickel-chromium-based alloy such as INCONEL™ which is available from Special Metals Corporation of New Hartford, N.Y., USA, aluminum, aluminum-based alloy, steel, or stainless steel, or other materials. In various embodiments, retaining ring 180 may include a high performance nickel-based super alloy such as WASPALOY™ which is available from Special Metals Corporation of New Hartford, N.Y., USA.

In various embodiments, second portion 210 of retaining ring 180 adjacent to or approaching terminal edges 202, 204 may include a linearly tapered geometry. A thickness of retaining ring 180 may be greater along a body of retaining ring 180, i.e. at first portion 208, than near terminal edges 202, 204 at second portion 210. The thickness of retaining ring 180 between outer surface 196 and inner surface 206 of first portion 208 may therefore be greater than the thickness between outer surface 196 and inner surface 206 of second portion 210. In various embodiments, inner surface 206 of retaining ring 180 may be beveled or tapered at second portion 210, which may be a terminal portion. At second portion 210 approaching terminal edge 202, for example, inner surface 206 may slope away from first engine component 172, such as cover plate 140, and taper toward terminal edge 202 as retaining ring 180 approaches terminal edge 202. In various embodiments, axially forward surface 194 of cover plate 140 and inner surface 206 of retaining ring 180 may define a gap 212 between cover plate 140 and second portion 210 of retaining ring 180. Cover plate 140 may flex or deform into gap 212 and may contact second portion 210 of retaining ring 180. In various embodiments, outer surface 196 of retaining ring 180 may be beveled or tapered at second portion 210, which may be a terminal portion. At second portion 210 approaching terminal edge 204, for example, inner surface 206 may slope away from a second engine component 174, such as flange 160, and taper toward terminal edge 202 as retaining ring 180 approaches terminal edge 202. Axially aft surface 192 of flange 160 and outer surface 196 of retaining ring 180 may define a gap 214 between cover plate 140 and second portion 210 of retaining ring 180. Cover plate 140 may flex or deform towards retaining ring 180, which may flex or deform retaining ring 180 into gap 214, and outer surface 196 of second portion 210 of retaining ring 180 may contact flange 160. In various embodiments, each of second portions 210 may taper or slope away from or towards first engine component 172, such as cover plate 140. In various embodiments, each of second portions 210 may taper or slope away from or towards second engine component 174, such as flange 160.

The tapered geometry of second portions 210 near terminal edges 202, 204 may decrease the mechanical stress in cover plate 140 at each of areas 220, 222. Areas 220, 222 represent portions of cover plate 140 adjacent to the transition points where retaining ring 180 terminates and opening 200 begins. The tapered geometry of retaining ring 180 may create a smoother transition than an abrupt or 90 degree transition between a body of retaining ring 180 and opening 200 between terminal edges 202, 204 of retaining ring 180. The tapered geometry of retaining ring 180 may decrease mechanical stress in cover plate 140 and may increase the operational capability of cover plate 140.

Figure 2D:
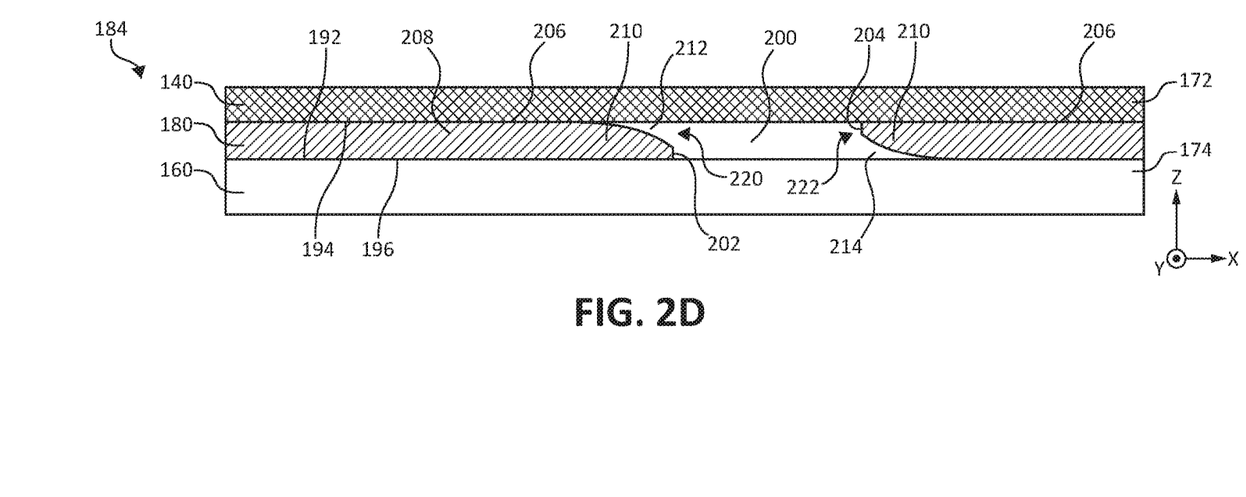
FIG. 2D illustrates a radial cross-sectional view taken along line B-B' of FIG. 2B of a rounded tapered retaining ring of a retaining ring assembly, in accordance with various embodiments.

With reference to FIG. 2D, a retaining ring assembly 184 having a retaining ring 180 with a curved and tapered terminal portion is shown in accordance with various embodiments. In various embodiments, second portion 210 of retaining ring 180 adjacent to or approaching terminal edges 202, 204 may include a curvedly tapered geometry. Second portion 210 may include a curved inner surface 206 sloping away from a first engine component 172, which may comprise cover plate 140. Cover plate 140 may flex or deform into gap 212 and may contact second portion 210 of retaining ring 180. Second portion 210 may include a curved outer surface 196 sloping toward cover plate 140. Cover plate 140 may flex or deform towards retaining ring 180, which may flex or deform retaining ring 180 into gap 214, and outer surface 196 of second portion 210 of retaining ring 180 may contact a second engine component 174, such as flange 160. The tapered geometry of second portions 210 near terminal edges 202, 204 may decrease the mechanical stress on cover plate 140 at each of areas 220, 222.

Figure 2E:
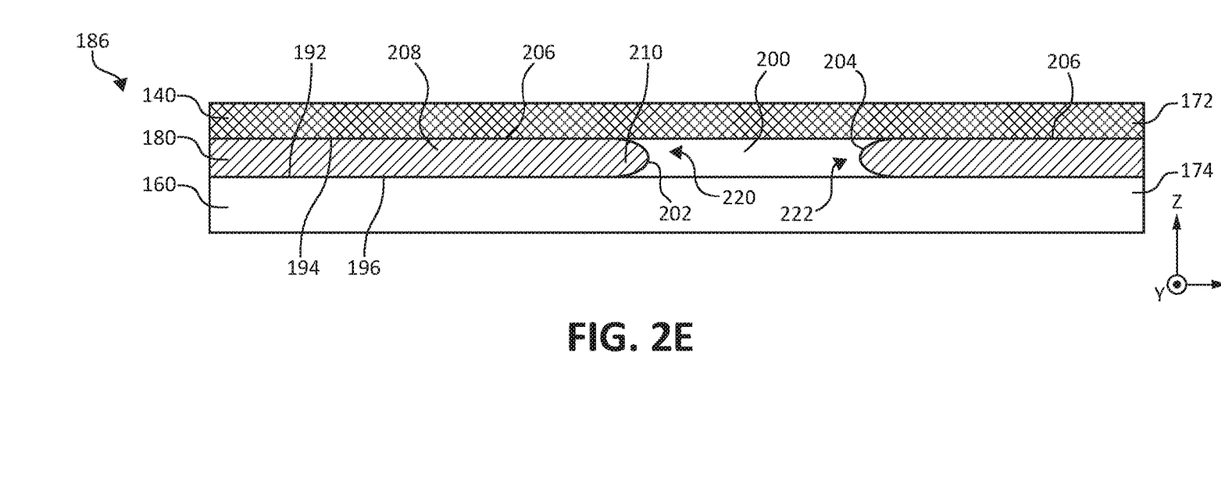
FIG. 2E illustrates a radial cross-sectional view taken along line B-B' of FIG. 2B of a contoured retaining ring of a retaining ring assembly, in accordance with various embodiments.

With reference to FIG. 2E, a retaining ring assembly 186 having a retaining ring 180 with a contoured terminal portion is shown in accordance with various embodiments. Retaining ring 180 may include a first portion 208 having a flat geometry with a generally uniform thickness and may include a second portion 210 having a rounded, and/or contoured geometry. Second portion 210 may comprise a terminal portion of retaining ring 180 and may comprise terminal edges 202, 204, which may be rounded or contoured. Retaining ring 180 may include opening 200 defined by terminal edge 202 and terminal edge 204 of retaining ring 180. Cover plate 140 may flex or deform into opening 200. The contoured geometry of terminal edges 202, 204 may decrease the mechanical stress on cover plate 140 at each of areas 220, 222.

Figure 2F:
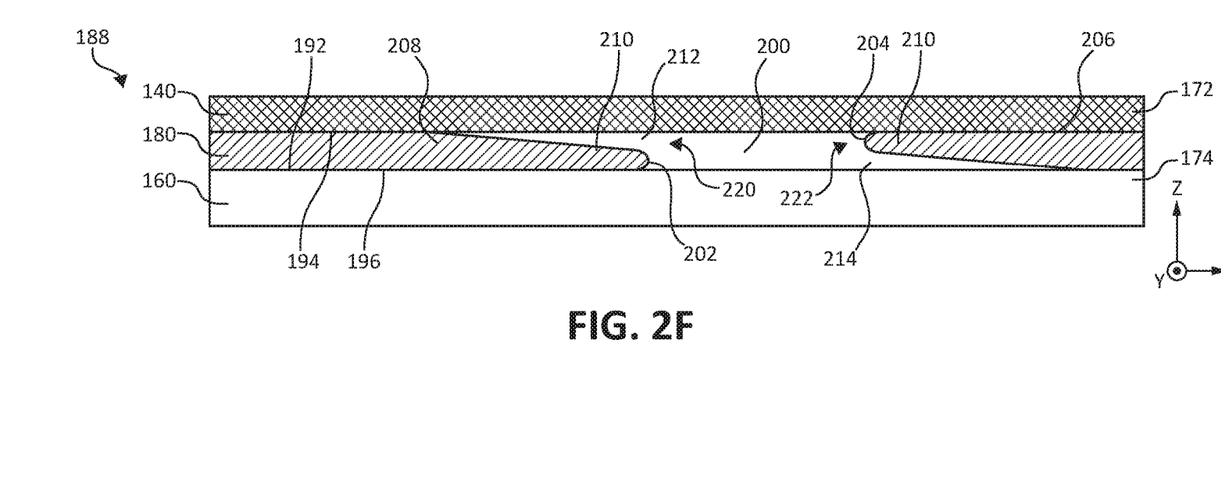
FIG. 2F illustrates a radial cross-sectional view taken along line B-B' of FIG. 2B of a tapered and contoured retaining ring of a retaining ring assembly, in accordance with various embodiments.

With reference to FIG. 2F, a retaining ring assembly 188 having a retaining ring 180 with a tapered and contoured terminal portion is shown in accordance with various embodiments. Retaining ring 180 may include a first portion 208 having a flat geometry with a generally uniform thickness and may include a second portion 210 having a tapered and contoured geometry. Second portion 210 of retaining ring 180 adjacent to or approaching terminal edges 202, 204 may include a linearly tapered geometry and terminal edges 202, 204 may include a rounded and/or contoured geometry. In various embodiments, each of second portions 210 may taper or slope away from or towards a first engine component 172, which may comprise cover plate 140.

Second portion 210 of retaining ring 180 may include an inner surface 206 sloping away from cover plate 140. Cover plate 140 may flex or deform into gap 212 and may contact second portion 210 of retaining ring 180 upon flexing into gap 212. Second portion 210 may include an outer surface 196 sloping toward cover plate 140. Cover plate 140 may flex or deform towards retaining ring 180, which may flex or deform retaining ring 180 into gap 214, and outer surface 196 of second portion 210 of retaining ring 180 may contact flange 160 upon flexing into gap 214. Second portion 210 may further comprise terminal edges 202, 204 which are rounded or contoured. The tapered geometry of second portions 210 near terminal edges 202, 204 and the contoured geometry of terminal edges 202, 204 may decrease the mechanical stress on cover plate 140 at each of areas 220, 222.

While the discussion herein is directed to retaining ring 180 coupled to rotor disk 112 and cover plate 140, it will be understood by one skilled in the art that the systems and methods described herein are applicable to many types of retaining rings used with any rotating or stationary part. A split retaining ring having a tapered, curved, rounded, and/or contoured terminal end may be used, for example, with a gas path seal or for retaining a stationary component with respect to an engine case. Therefore, the disclosure herein is not limited to applications solely directed to retaining ring 180 coupled to cover plates 140, 142.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retaining ring assembly for a gas turbine engine, comprising:
    a first engine component;
    a second engine component; and
    a retaining ring disposed between the first engine component and the second engine component, wherein the retaining ring is circumferentially discontinuous and includes a first terminal portion having at least one of a tapered or a rounded geometry, a second terminal portion having at least one of a tapered or rounded geometry, a first gap between the first terminal portion and the first engine component, a second gap between the second terminal portion and the second engine component, and an opening defined between the first terminal portion and the second terminal portion along an entire axial thickness of the retaining ring between the first terminal portion and the second terminal portion, wherein the first terminal portion is flush with the second engine component and the second terminal portion is flush with the first engine component.

2. The retaining ring assembly of claim 1, wherein an axial thickness of the retaining ring at the first terminal portion is less than an axial thickness of the retaining ring away from the first terminal portion.

3. The retaining ring assembly of claim 1, wherein the first terminal portion includes a rounded terminal edge.

4. The retaining ring assembly of claim 1, wherein an axially inner surface of the retaining ring slopes away from the first engine component and toward a first terminal edge.

5. The retaining ring assembly of claim 1, wherein an axially outer surface of the retaining ring slopes away from the second engine component and toward a second terminal edge.

6. The retaining ring assembly of claim 5, wherein the axially outer surface of the retaining ring includes a curved slope.

7. A rotor assembly of a gas turbine engine, comprising:
a rotor disk;
a rotor blade coupled to the rotor disk, the rotor disk configured to rotate about an axis; and
a retaining ring assembly, comprising:
a flange extending axially from the rotor disk,
a cover plate disposed between the flange and the rotor disk, and
a retaining ring disposed between the flange and the cover plate, wherein the retaining ring is circumferentially discontinuous and includes a first terminal portion having at least one of a tapered or a rounded geometry, a second terminal portion having at least one of a tapered or rounded geometry, a first gap between the first terminal portion and the flange, a second gap between the second terminal portion and the cover plate, and an opening defined between the first terminal portion and the second terminal portion along an entire axial thickness of the retaining ring between the first terminal portion and the second terminal portion, wherein the first terminal portion is flush with the cover plate and the second terminal portion is flush with the flange.

8. The rotor assembly of claim 7, wherein the first terminal portion includes a rounded terminal edge.

9. The rotor assembly of claim 7, wherein an axial thickness of the retaining ring at the first terminal portion is less than an axial thickness of the retaining ring away from the first terminal portion.

10. The rotor assembly of claim 7, wherein an axially inner surface of the retaining ring slopes away from the cover plate and toward a first terminal edge.

11. The rotor assembly of claim 7, wherein an axially outer surface of the retaining ring slopes away from the flange and toward a second terminal edge.

12. The rotor assembly of claim 11, wherein the axially outer surface of the retaining ring includes a curved slope.

13. The rotor assembly of claim 7, wherein the cover plate is disposed circumferentially along a radially outward edge of the rotor disk.

14. The rotor assembly of claim 7, wherein the rotor assembly is a part of a compressor section or a turbine section.

15. A gas turbine engine, comprising:
a turbine section including a rotor assembly, the rotor assembly comprising:
a rotor disk,
a rotor blade coupled to the rotor disk, the rotor disk configured to rotate about an axis, and
a retaining ring assembly, the retaining ring assembly comprising:
a flange extending axially from the rotor disk,
a cover plate disposed between the flange and the rotor disk, and
a retaining ring disposed between the flange and the cover plate, wherein the retaining ring is circumferentially discontinuous and includes a first terminal portion having at least one of a tapered or a rounded geometry, a second terminal portion having at least one of a tapered or rounded geometry, a first gap between the first terminal portion and the flange, a second gap between the second terminal portion and the cover plate, and an opening defined between the first terminal portion and the second terminal portion along an entire axial thickness of the retaining ring between the first terminal portion and the second terminal portion, wherein the first terminal portion is flush with the cover plate and the second terminal portion is flush with the flange.

16. The gas turbine engine of claim 15, wherein the first terminal portion includes a rounded terminal edge.

17. The gas turbine engine of claim 15, wherein an axially inner surface of the retaining ring slopes away from the cover plate at the first terminal portion.

18. The gas turbine engine of claim 15, wherein a thickness of the retaining ring at the first terminal portion is less than a thickness of the retaining ring away from the first terminal portion.

* * * * *